(12) United States Patent
Becklin

(10) Patent No.: US 11,852,434 B1
(45) Date of Patent: Dec. 26, 2023

(54) LOCKING TAKEDOWN PIN AND PIVOT PIN

(71) Applicant: ERA3 LLC, Merlin, OR (US)

(72) Inventor: Dennis Sterling Becklin, Grants Pass, OR (US)

(73) Assignee: ERA3 LLC, Merlin, OR (US)

( * ) Notice: Subject to any disclaimer, the term of this patent is extended or adjusted under 35 U.S.C. 154(b) by 0 days.

(21) Appl. No.: 17/983,315

(22) Filed: Nov. 8, 2022

(51) Int. Cl.
  *F41A 3/66* (2006.01)
  *F16B 21/12* (2006.01)

(52) U.S. Cl.
  CPC ............... *F41A 3/66* (2013.01); *F16B 21/12* (2013.01)

(58) Field of Classification Search
  None
  See application file for complete search history.

(56) References Cited

U.S. PATENT DOCUMENTS

| | | | |
|---|---|---|---|
| 10,126,078 B1 * | 11/2018 | Harris | F16B 21/125 |
| 10,267,584 B2 * | 4/2019 | Kasanjian-King | F41A 11/00 |
| 10,663,239 B2 * | 5/2020 | Timmons | F41A 3/66 |
| 10,704,851 B1 * | 7/2020 | Redillo | F41A 17/42 |
| 10,866,042 B1 * | 12/2020 | Huang | F16B 21/165 |
| 11,112,197 B2 * | 9/2021 | Underwood | F41A 11/00 |
| 11,215,212 B2 * | 1/2022 | Adams | F16B 19/02 |

\* cited by examiner

*Primary Examiner* — Reginald S Tillman, Jr.
(74) *Attorney, Agent, or Firm* — Lowe Graham Jones PLLC

(57) ABSTRACT

The present invention is directed to system of fasteners for a firearm, which includes a takedown pin and pivot pin for coupling an upper receiver to the lower receiver of a firearm. The system includes a first component defining one or more first openings and a second component defining one or more second openings. A detent mechanism is secured to the second component and includes a detent pin. A locking pin is configured to insert through the first opening and the second opening to secure the first component to the second component. The locking pin defines a detent opening positioned to receive the detent pin when the locking pin is inserted through the second opening. A release pin is positioned within the locking pin and is configured to urge the detent pin outwardly relative to the locking pin when the release pin is translated relative to the locking pin.

19 Claims, 11 Drawing Sheets

SECTION A-A

LOCKING TAKEDOWN PIN AND PIVOT PIN

FIELD OF THE INVENTION

This application relates to fasteners for a firearm, and, more particularly to a takedown pin and pivot pin for coupling an upper receiver to the lower receiver of a firearm.

BACKGROUND OF THE INVENTION

The AR10 and AR15 are very popular firearm platforms. These platforms typically include an upper receiver and a lower receiver that are detachable from one another, and each contain various components of the firearm. For example, the barrel and buffer tube are mounted to the upper receiver and the upper receiver defines a cavity sized and configured to receive the gas block and gas tube, bolt carrier group, charging handle, forward assist, and ejection port cover. The lower receiver houses the trigger mechanism, ejector mechanism, and hammer mechanism.

SUMMARY OF THE INVENTION

In one aspect of the invention, a system includes a first component defining one or more first openings and a second component defining one or more second openings. A detent mechanism is secured to the second component and includes a detent pin. A locking pin is configured to insert through the one or more first openings and the one or more second openings to secure the first component to the second component. The locking pin defines a detent opening positioned to receive the detent pin when the locking pin is inserted through the one or more second openings. A release pin is positioned within the locking pin and is configured to urge the detent pin outwardly relative to the locking pin when the release pin is translated relative to the locking pin.

The first component and the second component may be portions of a firearm. The first component may be an upper receiver of a firearm and the second component may be a lower receiver of a firearm. The upper receiver may have mounted thereto one or more of a buffer tube, gas block, gas tube, bolt carrier group, charging handle, forward assist, and ejection port cover. The lower receiver may have mounted thereto one or more of a trigger mechanism, ejector mechanism, and hammer mechanism.

In some embodiments, the release pin defines a groove positioned to receive the detent pin and to disengage from the detent pin when the release pin is translated. The detent mechanism may include a cavity and a spring mounted within the cavity and configured to urge the detent pin outwardly from the cavity. A spring may be positioned within the locking pin and configured to urge the release pin toward the detent opening.

The locking pin may include a shaft defining a cavity and a cap secured to the shaft over the cavity, the release pin and spring being positioned within the cavity. The shaft may define a release opening, the spring configured to urge a portion of the release pin outwardly from the cavity through the release opening. The locking pin includes a shaft defining the detent opening and an exterior groove extending from the detent opening, the detent pin being slidable within the exterior groove when not positioned within the detent opening.

In some embodiments, the detent opening is a first detent opening, the shaft defining a second detent opening with the exterior groove extending between the first detent opening and the second detent opening, the second detent opening configured to receive the detent pin with the locking pin removed from the one or more first openings.

In some embodiments, the one or more second openings comprise two second openings and the one or more first openings are positioned between the two second openings when the locking pin is inserted through the one or more first openings and the one or more second openings. The second detent opening may be positioned such that the detent pin is positioned within the second detent opening when the locking pin is inserted through only one of the two second openings and is not inserted through any of the one or more first openings.

In another aspect of the invention, a locking pin includes a cap and a shaft securable to the cap. The shaft defines a shaft cavity, a release opening extending through the shaft to the shaft cavity, and a detent opening extending through the shaft to the shaft cavity. A release pin is positioned within the shaft cavity and defines a detent groove positionable over the detent opening. A spring is positioned within the shaft cavity and is configured to urge a portion of the release pin outwardly relative to the release opening with the detent groove positioned over the detent opening. The release pin is slidable within the shaft cavity such that the detent groove may be moved away from the detent opening responsive to pressing of the portion of the release pin The shaft may define an exterior groove extending from the detent opening parallel to an axis of symmetry of the shaft. The detent opening is a first detent opening and the shaft defines a second detent opening with the exterior groove extending between the first detent opening and the second detent opening.

The cap may define a cap cavity sized to receive a portion of the shaft. The portion of the shaft may define one or more grooves and the cap may define one or more pins configured to engage the one or more grooves to secure the cap onto the shaft. The cap may define a cap opening positioned over the detent opening when the cap is secured onto the shaft. The pin may define a release pin cavity, the spring positioned within the release pin cavity.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
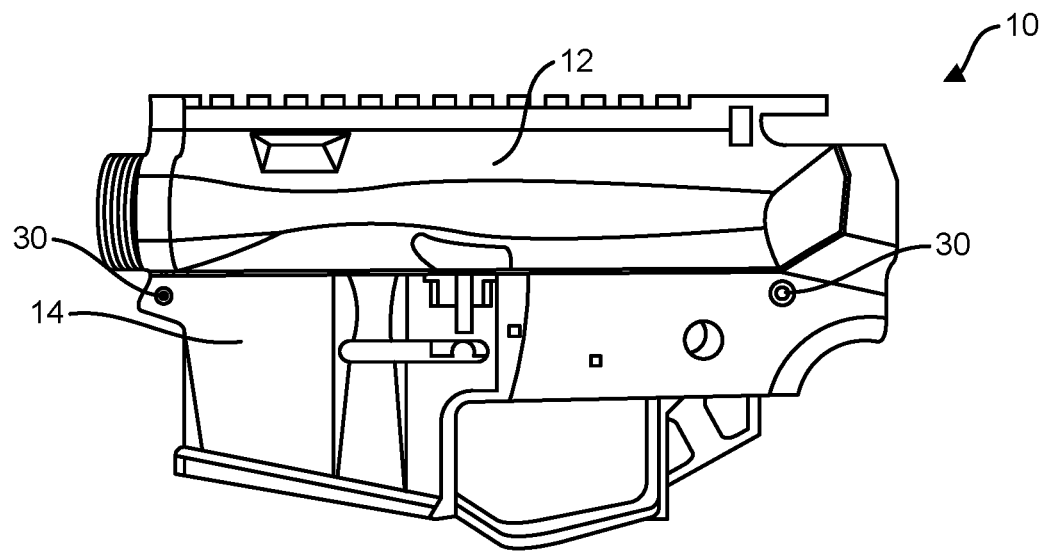
FIG. 1A is a left side view of the upper receiver and lower receiver of a firearm including locking pins in accordance with an embodiment of the present invention.
Figure 1B:
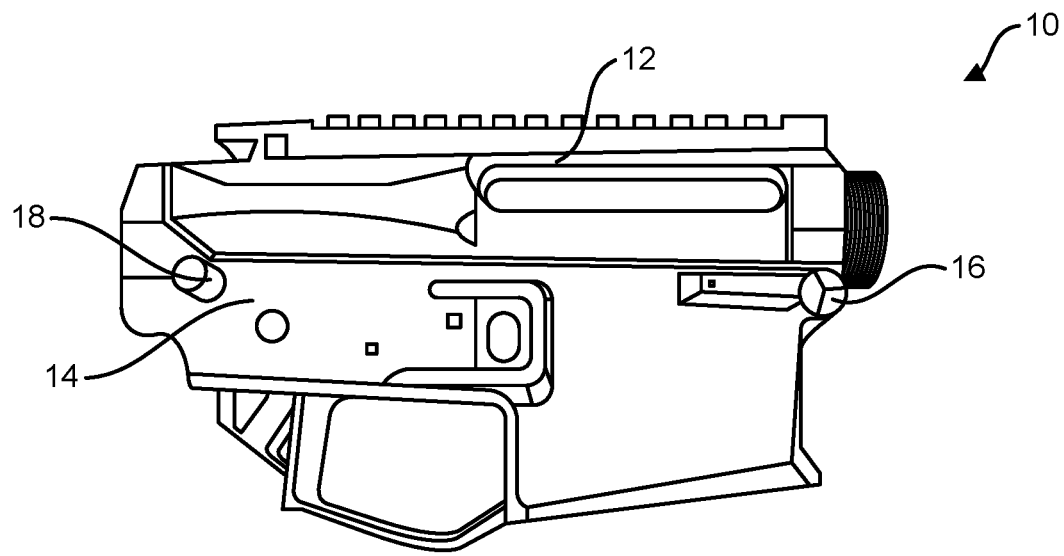
FIG. 1B is a right side view of the upper receiver and lower receiver of a firearm including locking pins in accordance with an embodiment of the present invention.
Figure 1C:
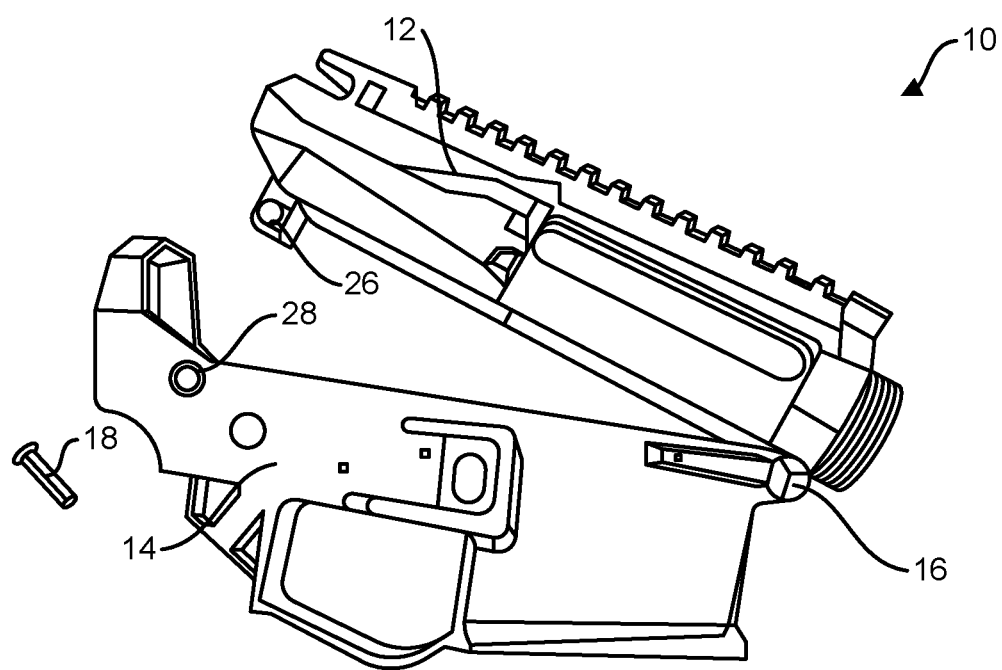
FIG. 1C is a right side view of the upper and lower receiver rotated relative to one another about one locking pin in accordance with an embodiment of the present invention.

Referring to FIGS. 1A to 1C, a firearm assembly 10 includes an upper receiver 12 and a lower receiver 14. The upper receiver 12 and lower receiver 14 may be part of an AR10, AR15, or other firearm platform. The upper receiver 12 may be configured to have a barrel and buffer tube secured thereto. The upper receiver 12 may define a cavity within which may be mounted a gas block and gas tube, bolt carrier group, charging handle, forward assist, and ejection port cover. The lower receiver 14 may define a cavity within which is mounted a trigger mechanism, ejector mechanism, and hammer mechanism. The lower receiver 14 is further configured to receive a magazine. This arrangement is exemplary only and other arrangements and distributions of parts among the upper receiver 12 and lower receiver 14 may also be used. Likewise, although an upper receiver 12 and a lower receiver 14 are described, any two components may be fastened together using the approach described herein.

The upper receiver 12 and lower receiver 14 may be secured to one another by means of a pivot pin 16 and a takedown pin 18. The pivot pin 16 and takedown pin 18 may be implemented as locking pins as described in greater detail below and may operate in an identical manner though the pivot pin 16 and takedown pin 18 may have different lengths, diameters, shapes or other attributes. Each pin 16, 18 includes a release pin 30. The release pin 30 may be pressed to release each pin 16, 18. The take down pin 18 may be removed (see FIG. 1C), allowing the upper receiver 12 to pivot relative to the lower receiver 14 about the pivot pin 16. The pivot pin 16 may also be removed (see FIG. 1D) in order to completely detach the upper receiver 12 from the lower receiver 14.

Figure 1D:
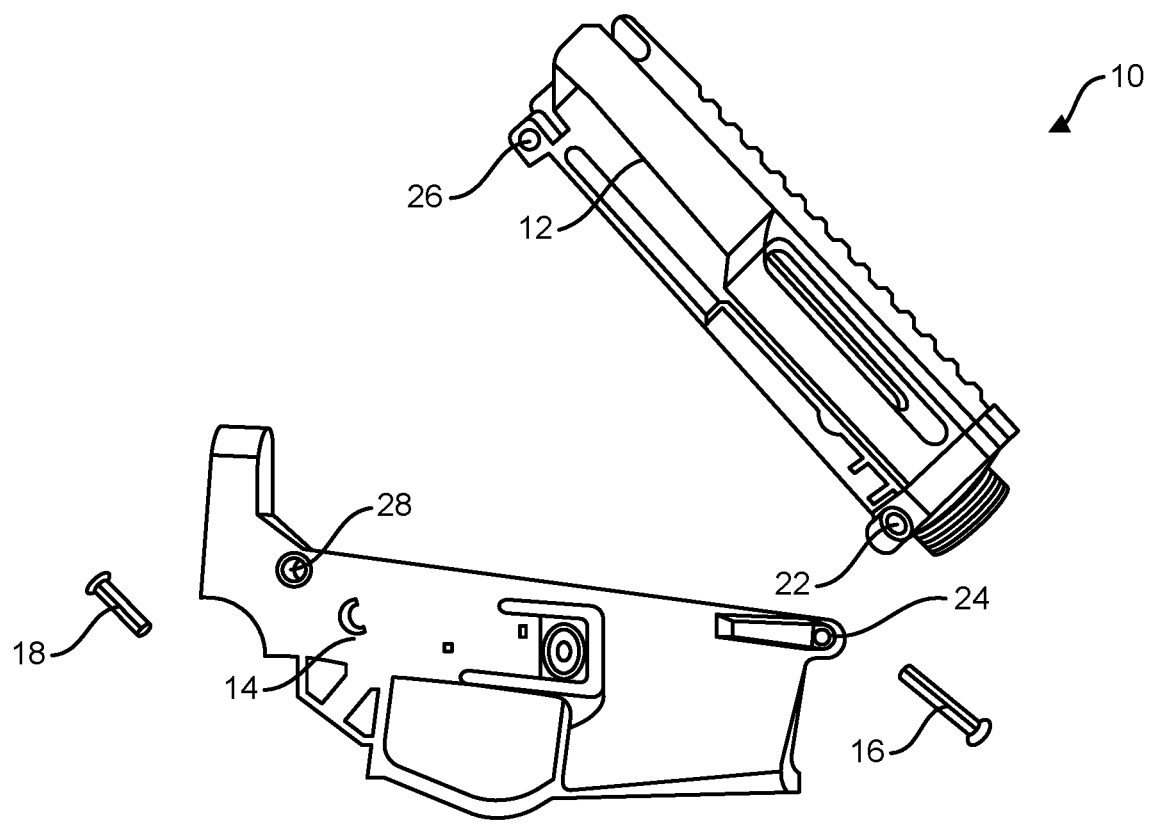
FIG. 1D is a right side view of the upper and lower receiver completely detached from one another with locking pins removed in accordance with an embodiment of the present invention.

As is apparent in FIGS. 1C and 1D, the pivot pin 16 may pass through one or more opening 22 defined by the upper receiver 12 and pass through openings 24 defined by the lower receiver 14 and positioned on either side of the opening 22 when the upper receiver 12 and lower receiver 14 are assembled. Likewise, the takedown pin 18 may pass through one or more openings 26 defined by the upper receiver 12 and pass through openings 28 defined by the lower receiver 14 and positioned on either side of the opening 26 when the upper receiver 12 and lower receiver 14 are assembled.

Figure 2A:
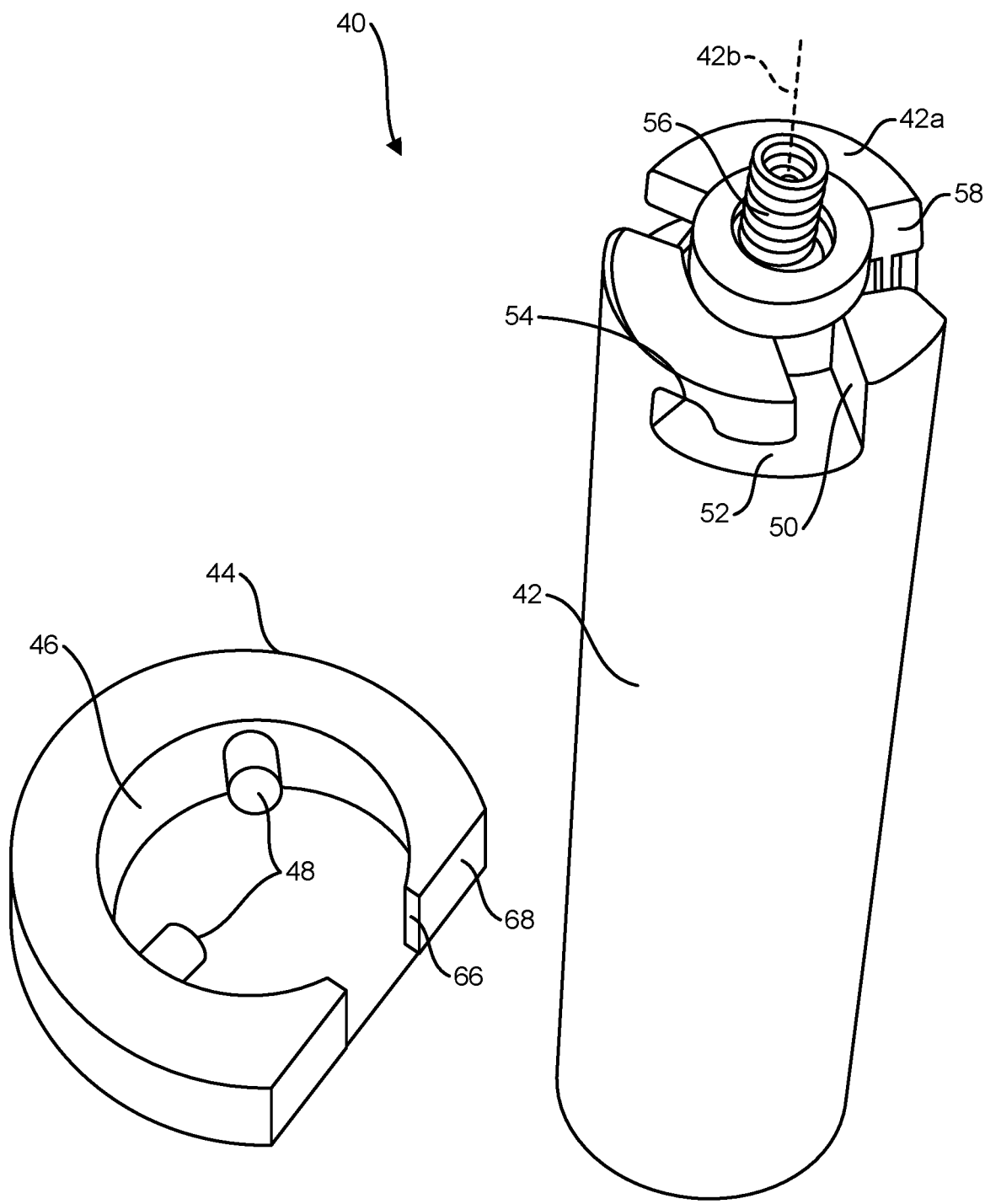
FIG. 2A is an isometric view of the locking pin with cap removed in accordance with an embodiment of the present invention.
Figure 2B:
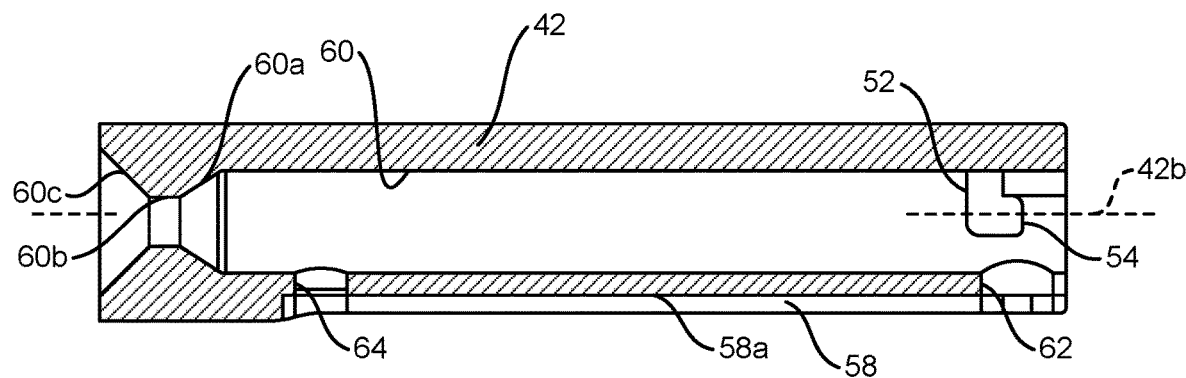
FIG. 2B is a side cross-sectional view of the locking pin in accordance with an embodiment of the present invention.
Figure 2C:
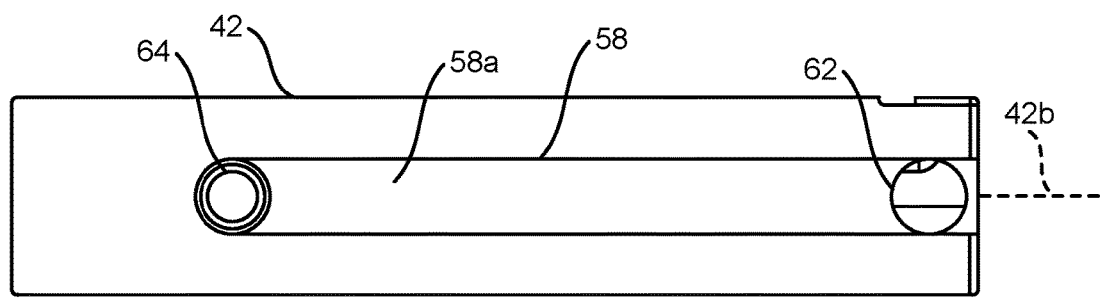
FIG. 2C is a top view of the locking pin in accordance with an embodiment of the present invention.

Referring to FIGS. 2A to 2C, a locking pin 40 may be used to implement either of the pivot pin 16 and the takedown pin 18. The illustrated locking pin 40 corresponds to the pivot pin 16 shown throughout the figures. Although possibly different in diameter, length, cap shape, and possibly other features, the takedown pin 18 may operate in an identical manner.

The locking pin 40 includes a shaft 42 and a cap 44. The shaft 42 may be a cylinder within manufacturing tolerances or may be tapered, i.e., a frusto-conical shape, or have other non-cylindrical features formed thereon. A cap 44 secures to the shaft 42 and may be removably secured to the shaft 42. In the illustrated embodiment, the cap 44 defines a cavity 46 sized to receive a portion of the shaft 42, either freely or with a friction fit. One or more pins 48 extend inwardly into the cavity 46. The portion of the shaft 42 that inserts within the cavity 46 defines one or more longitudinal grooves 50 extending inwardly from an end 42a of the shaft 42 and extending parallel to the axis of symmetry 42b of a cylindrical, conical, or other round portion of the shaft 42. Each longitudinal groove 50 may connect to a circumferential groove 52 extending circumferentially (e.g., a circular path about the axis of symmetry 42b) from the longitudinal groove. Each circumferential groove 52 may extend to a locking groove 54 that extents from the circumferential groove 52 in the longitudinal direction, e.g., toward the end 42a but not extending completely to the end 42a.

In use, the pins 48 are inserted into the longitudinal grooves 50, the cap 44 is rotated to slide the pins 48 along the circumferential groove 52 until the pins 48 are aligned circumferentially with the locking groove 54. A spring 56 interposed between the release pin 30 and the cap 44 will then urge the pins 48 into the locking groove 54 thereby hindering circumferential rotation of the cap 44 unless the cap 44 is pressed against the shaft 42 until the pins 48 are moved out of the locking groove 54.

The shaft 42 may define an external groove 58 that extends parallel to the axis of symmetry 42b. The shaft 42 also defines a cavity 60 that slidably receives the release pin 30. In the illustrated embodiment, the external groove 58 extends only partially through the shaft 42 toward the cavity 60 but does not extend completely through the shaft 42 and connect to the cavity 60, thereby defining a slot floor 58a. The slot floor 58a may define one or more openings 62, 64 that do extend through to the cavity 60. For example, opening 62 may be positioned closer to the cap 44 than the opening 64. In the illustrated embodiment, the opening 64 is positioned at the end of the slot 58 opposite the cap 44.

In the illustrated embodiment, the cap 44 defines a corresponding groove or opening 66 that is aligned with the opening 62 when the cap 44 is secured to the shaft 42. The cap 44 may include a flattened surface 68, e.g., a surface that is tangent to a circle centered on the axis of symmetry 42b. The groove 66 may be defined in this flattened surface 68.

The shaft 42 may define tapered cavity portion 60a, a reduced diameter cavity portion 60b, and a flared cavity portion 60c. The reduced diameter cavity portion 60b has a reduced diameter relative to the diameter of the cavity 60 and may have a cylindrical shape centered on the axis of symmetry 42b. The tapered cavity portion 60a may define a conical transition between the cavity 60 and the reduced diameter cavity portion 60b. The flared portion 60c may be a conical shape or other shape extending outwardly from the reduced diameter cavity portion 60b. The flared portion 60c extends to the end of the shaft 42 opposite the end 42a to which the cap secures and is open at the wide end thereof. The flared portion 60c provides a volume for receiving a user's finger when pressing on the release pin 30 while protecting the release pin 30 from unintentional impacts. The flared portion 60c may also have a cylindrical or other shape.

Figure 3A:
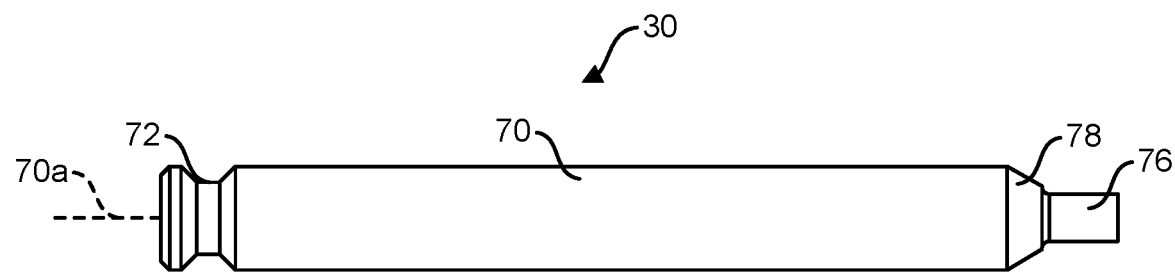
FIG. 3A is a side view of a release pin for use within the locking pin in accordance with an embodiment of the present invention.
Figure 3B:
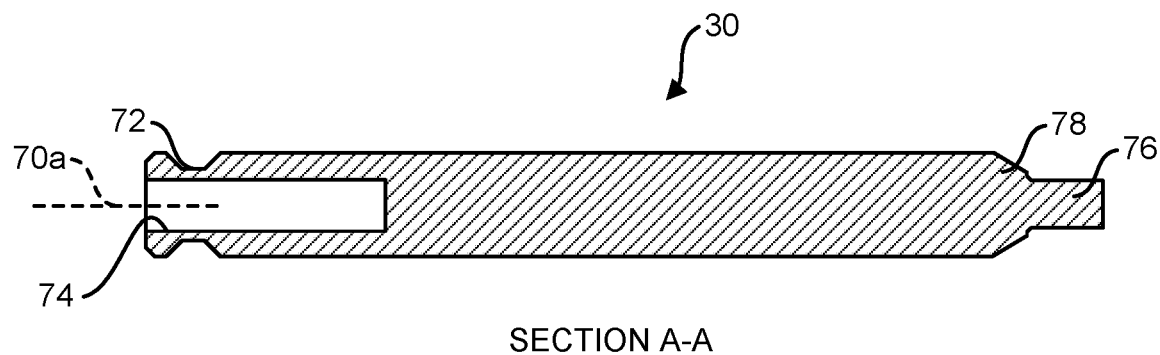
FIG. 3B is a side cross-sectional view of the release pin in accordance with an embodiment of the present invention.

Referring to FIGS. 3A and 3B, a release pin 30 may have some or all of the illustrated features. The release pin 30 includes a shaft 70 sized to slidably be received within the cavity 60. For example, the shaft 70 and cavity 60 may each be cylindrical with the diameter of the shaft 70 sized to insert within the cavity 60 without interference. At one end of the shaft 70, a circumferential groove 72 is formed around the axis of symmetry 70a of the shaft 70. The circumferential groove 72 may have a rounded and/or beveled cross-sectional shape to enable a detent pin (see below) to slide in and out of the circumferential groove 72. The detent pin extends through the opening 62 to engage the circumferential groove 72 as described below. In some implementations, the circumferential groove 72 may be replaced with a detent cavity that does not extend around the entire circumference of the shaft 70, such as where the shaft 70 is non-cylindrical or has non-cylindrical features formed thereon to align the detent cavity with the opening 62.

The release pin 30 may further define a spring cavity 74 receiving a portion of the spring 56. The spring cavity 74 may extend through one end ("the cap end") of the shaft 70 that is positioned closer to the cap 44 during use than an opposite end of the shaft 70. The spring cavity 74 may be a cylindrical cavity centered on the axis of symmetry 70a. The spring cavity 74 may pass through the circumferential groove 72 and the circumferential groove 72 may be positioned closer to the cap end of the shaft 70 than to the opposite end of the shaft 70, e.g., offset from the cap end by less than 15 percent of the length of the shaft 70 along the axis of symmetry 70a A reduced diameter portion 76 is secured to or formed on the shaft 70 opposite the cap end and has a reduced diameter relative to the shaft 70. The reduced diameter portion 76 may have a cylindrical shape centered on the axis of symmetry 70a. A tapered, e.g., conical, transition region 78 may extend between the cylindrical portion of the shaft 70 and the reduced diameter portion 76. As described in greater detail below, the reduced diameter portion 76 may be exposed when the locking pin 40 is installed and may be pressed to release the locking pin 40 as described in greater detail below. For example, the reduced diameter portion 76 may pass through the reduced diameter cavity portion 60b and protrude into the flared portion 60c with the transition region 78 being pressed against the tapered portion 60a.

Figure 4A:
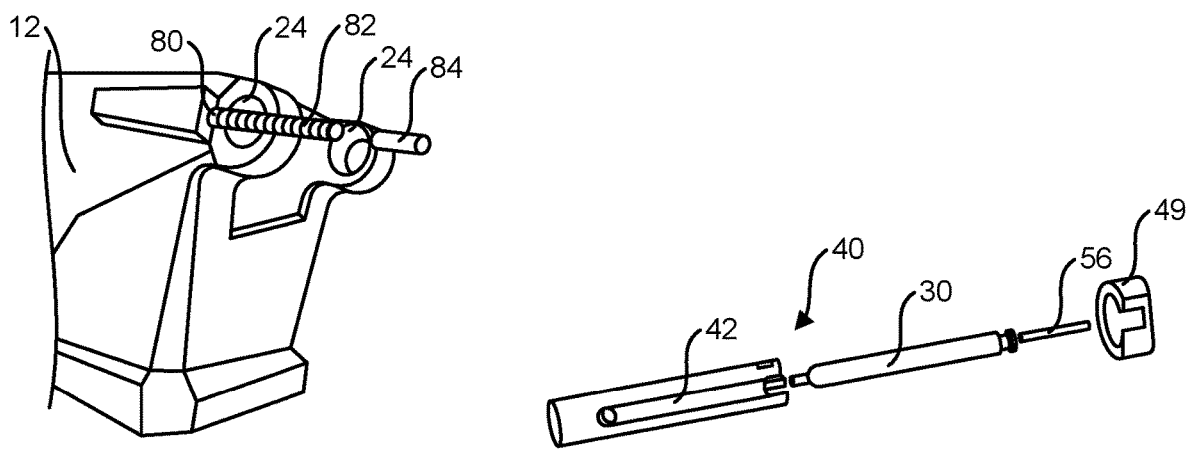
FIGS. 4A and 4B are isometric views illustrating the assembly of the locking pin and installation of the locking pin on the lower receiver.
Figure 4B:
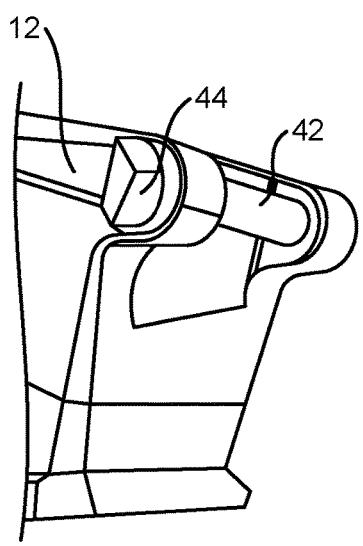

FIGS. 4A and 4B illustrate the manner in which the locking pin 40 is assembled and installed. First, the cap 44 is secured to the shaft 42 with the release pin 30 positioned within the shaft 42 and with the spring 56 positioned within the spring cavity 74 and positioned between the release pin 30 and the cap 44. The spring 56 extends outwardly from the spring cavity 74 such that the spring 56 biases the release pin 30 away from the cap 44.

The lower receiver 14 defines a cavity 80 into which a spring 82 is inserted, followed by a detent pin 84. As is apparent, the cavity 80 is positioned adjacent one of the openings 24 in the lower receiver (or one of the openings 28 in the case of the takedown pin 18) such that when the detent pin 84 is at least partially positioned within the cavity 80, a portion of the detent pin 84 extends across the openings 24 (or the openings 28), i.e. extends across the openings 24 when viewed along the axis of symmetry of the opening 24 (or the opening 28 in a like manner). For example, the cavity 80 may be cylindrical in shape with an axis of symmetry perpendicular to the axis of symmetry of the openings 24 (or the openings 28).

Figure 5A:
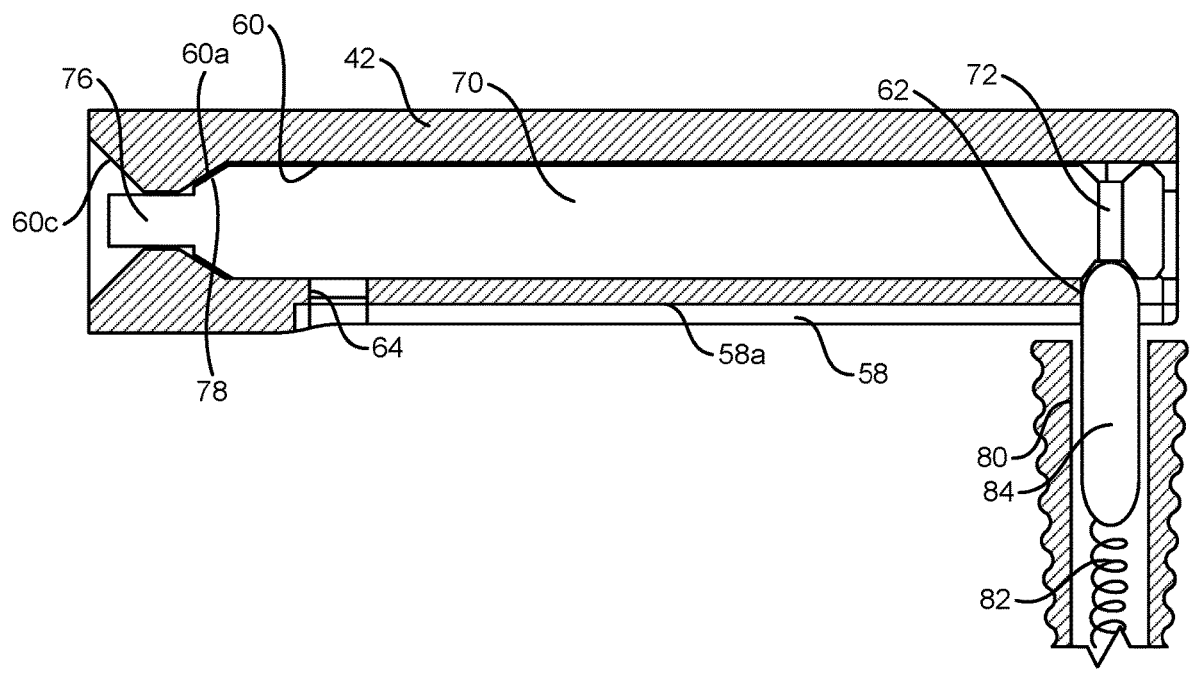
FIGS. 5A to 5C are side cross-sectional views illustrating the operation of the locking pin in accordance with an embodiment of the present invention.

Referring to FIG. 5A, with the detent pin 84 pressed into the cavity 80 to clear the opening 24, the shaft 42 may be inserted through the openings 24 (or openings 28) and the opening 22 (or opening 26) in the upper receiver 12 (see FIG. 1D). The shaft 42 may be oriented such that upon insertion, the detent pin 84 will recoil into the opening 62 and into the circumferential groove 72.

Figure 5B:
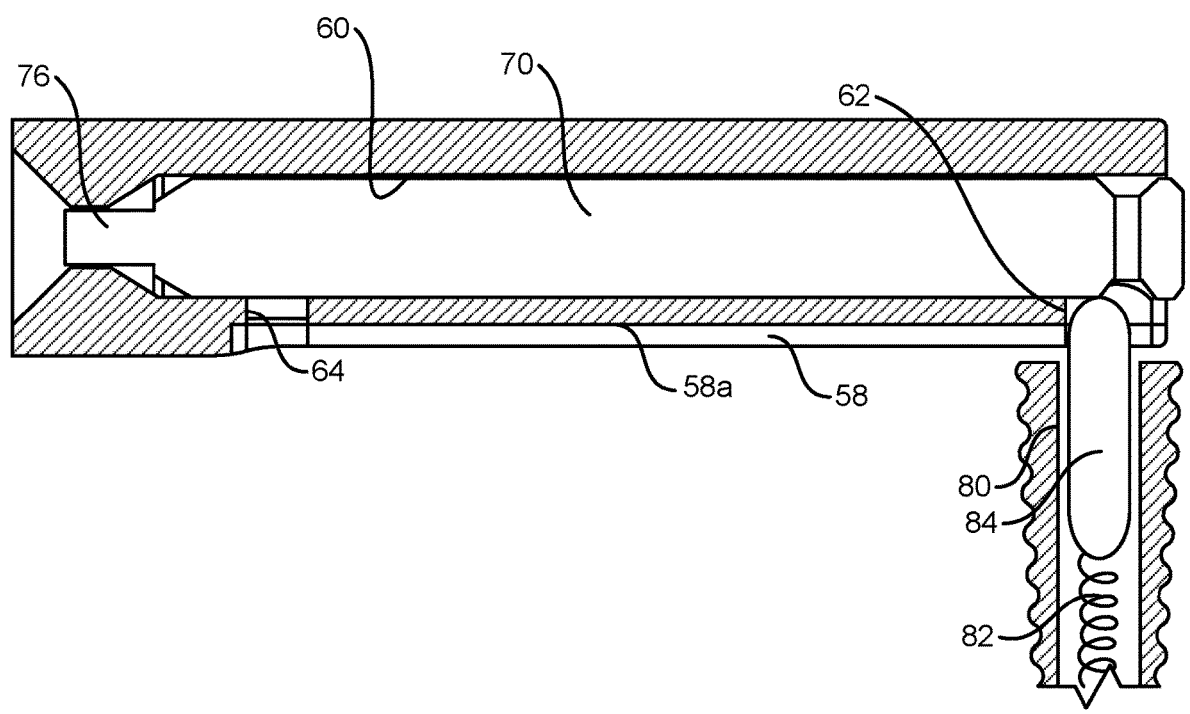
Figure 5C:
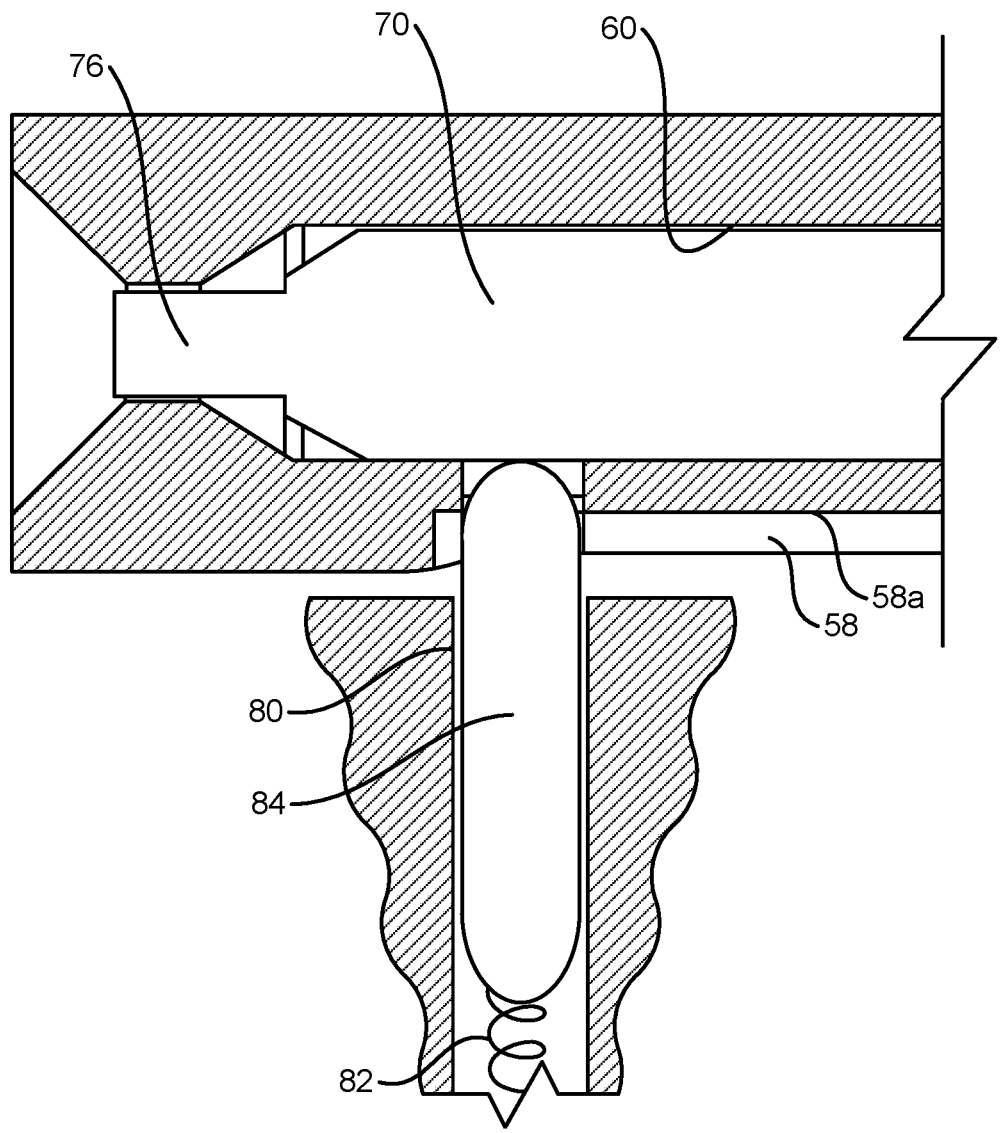

For example, referring to FIG. 5B, to release, a user presses on the reduced diameter portion 76. This forces the release pin 30 toward the cap 44 against the biasing force of the spring 56. The circumferential groove 72 is likewise forced toward the cap 44 thereby forcing the detent pin 84 out of the circumferential groove 72. Referring to FIG. 5C, the user may then continue to push on the locking pin 40 on the same side as the reduced diameter portion (left side in FIG. 5C) or pull on the cap 44 in order to pull the locking pin 30 out of the opening 22 (or opening 26). The locking pin 40 may be slid relative to the detent pin 84 until the detent pin 84 is positioned over the opening 64 and is forced into the opening 64 by the spring 82. In this manner, the locking pin 40 is held in place unless sufficient force is exerted to force the detent pin 84 out of the opening 64 to remove the locking pin 40 entirely from the opening 24 (or the opening 28).

Figure 6:
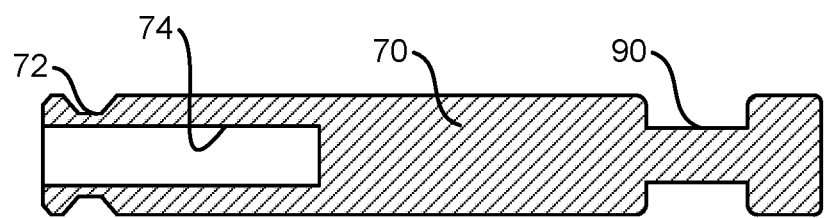
FIG. 6 is a side cross-sectional view of a release pin for use as in a takedown pin in accordance with an embodiment of the present invention.

FIG. 6 illustrates an alternative embodiment of a release pin 30. For example, the illustrated release pin 30 may be used in the takedown pin 18. In this embodiment, the reduced diameter portion 76 is omitted. The shaft 70 may include a circumferential groove 90 that may be used to retain the release pin 30 within the cavity 46. Accordingly, the portion of the release pin 30 that protrudes form the cavity 60 and may be pressed by a user need not have a reduced diameter portion and may have a variety of shapes and sizes while still achieving the benefits of the approach described herein.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed as defined as follows:

1. A system comprising:
   a first component defining one or more first openings;
   a second component defining one or more second openings;
   a detent mechanism secured to the second component and including a detent pin;
   a locking pin configured to insert through the one or more first openings and the one or more second openings to secure the first component to the second component, the locking pin defining a detent opening positioned to receive the detent pin when the locking pin is inserted through the one or more second openings; and
   a release pin positioned within the locking pin and configured to urge the detent pin outwardly relative to the locking pin when the release pin is translated relative to the locking pin;
   wherein the first component is an upper receiver of a firearm and the second component is a lower receiver of a firearm.

2. The system of claim 1, wherein the first component and the second component are portions of a firearm.

3. The system of claim 1, wherein the upper receiver has mounted thereto one or more of a buffer tube, gas block, gas tube, bolt carrier group, charging handle, forward assist, and ejection port cover.

4. The system of claim 1, wherein the lower receiver has mounted thereto one or more of a trigger mechanism, ejector mechanism, and hammer mechanism.

5. The system of claim 1, wherein the release pin defines a groove positioned to receive the detent pin and to disengage from the detent pin when the release pin is translated.

6. The system of claim 1, wherein the detent mechanism comprises a cavity and a spring mounted within the cavity and configured to urge the detent pin outwardly from the cavity.

7. The system of claim 1, further comprising a spring positioned within the locking pin and configured to urge the release pin toward the detent opening.

8. The system of claim 7, wherein the locking pin comprises a shaft defining a cavity and a cap secured to the shaft over the cavity, the release pin and spring being positioned within the cavity.

9. The system of claim 8, wherein the shaft defines a release opening, the spring configured to urge a portion of the release pin outwardly from the cavity through the release opening.

10. The system of claim 1, wherein the locking pin comprises a shaft defining the detent opening and an exterior groove extending from the detent opening, the detent pin being slidable within the exterior groove when not positioned within the detent opening.

11. The system of claim 10, wherein the detent opening is a first detent opening, the shaft defining a second detent opening with the exterior groove extending between the first detent opening and the second detent opening, the second detent opening configured to receive the detent pin with the locking pin removed from the one or more first openings.

12. The system of claim 11, wherein:
the one or more second openings comprise two second openings, the one or more first openings being positioned between the two second openings when the locking pin is inserted through the one or more first openings and the one or more second openings; and
the second detent opening is positioned such that the detent pin is positioned within the second detent opening when the locking pin is inserted through only one of the two second openings and is not inserted through any of the one or more first openings.

13. A system comprising:
locking pin comprising:
a cap;
a shaft securable to the cap and defining a shaft cavity, a release opening extending through the shaft to the shaft cavity, and a detent opening extending through the shaft to the shaft cavity;
a release pin positioned within the shaft cavity and defining a detent groove positionable over the detent opening; and
a spring positioned within the shaft cavity and configured to urge a portion of the release pin outwardly relative to the release opening with the detent groove positioned over the detent opening, the release pin being slidable within the shaft cavity such that the detent groove may be moved away from the detent opening responsive to pressing of the portion of the release pin;
a first component defining one or more first openings; and
a second component defining one or more second openings, the locking pin selectively securing the first component to the second component;
wherein the first component is an upper receiver of a firearm and the second component is a lower receiver of a firearm.

14. The system of claim 13, wherein the shaft defines an exterior groove extending from the detent opening parallel to an axis of symmetry of the shaft.

15. The system of claim 14, wherein the detent opening is a first detent opening, the shaft defining a second detent opening with the exterior groove extending between the first detent opening and the second detent opening.

16. The system of claim 13, wherein the cap defines a cap cavity sized to receive a portion of the shaft.

17. The system of claim 16, wherein the portion of the shaft defines one or more grooves and the cap defines one or more pins configured to engage the one or more grooves to secure the cap onto the shaft.

18. The system of claim 17, wherein the cap defines a cap opening positioned over the detent opening when the cap is secured onto the shaft.

19. The system of claim 13, wherein the release pin defines a release pin cavity, the spring positioned within the release pin cavity.

* * * * *